Oct. 30, 1923.
J. D. HAYNSWORTH
1,472,170
ELECTRICALLY HEATED SOLDER POT
Filed March 30, 1921
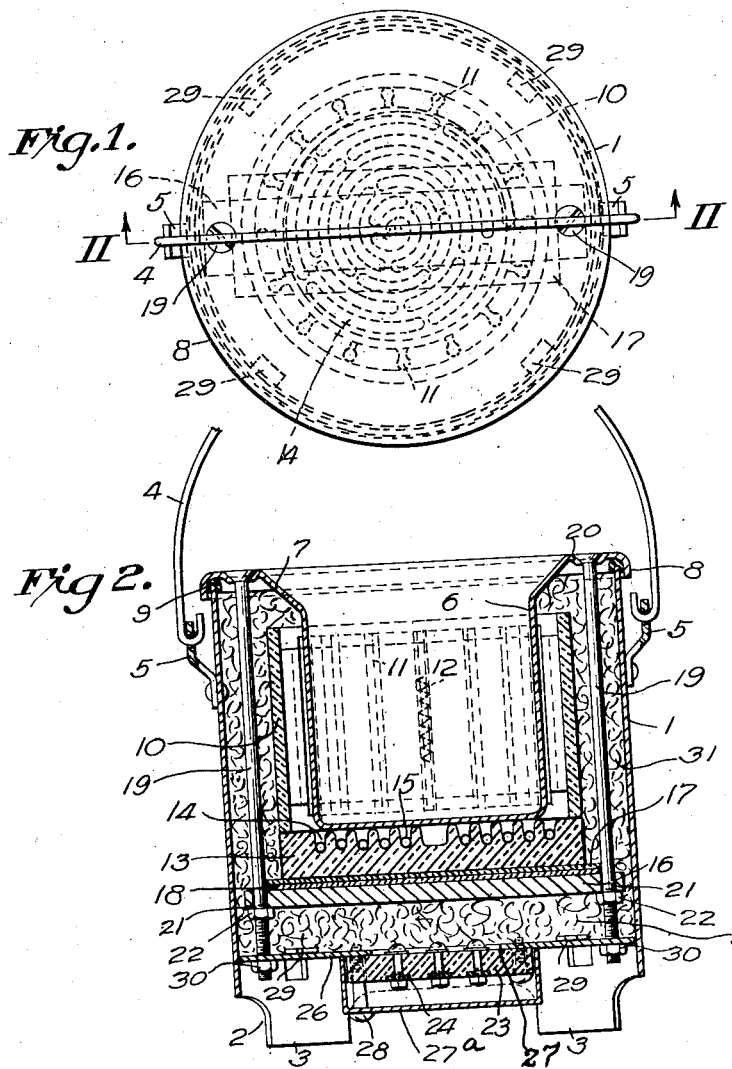
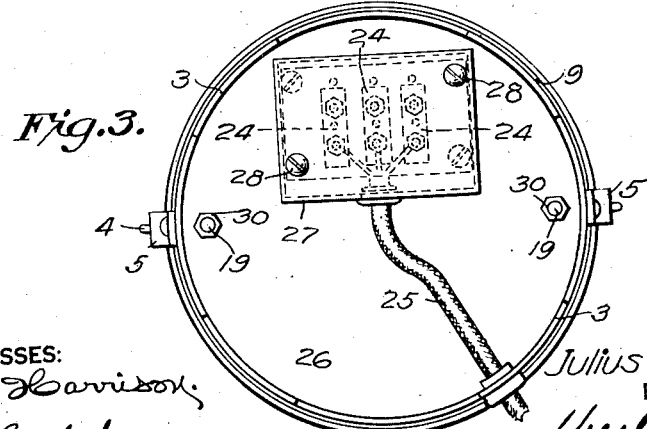
WITNESSES:
R. S. Harrison
H M Biebel
INVENTOR
Julius D. Haynsworth,
BY
Wesley G. Carr
ATTORNEY Patented Oct. 30, 1923.

1,472,170

UNITED STATES PATENT OFFICE.

JULIUS D. HAYNSWORTH, OF MANSFIELD, OHIO, ASSIGNOR TO WESTINGHOUSE ELECTRIC PRODUCTS COMPANY, A CORPORATION OF OHIO.

ELECTRICALLY-HEATED SOLDER POT.

Application filed March 30, 1921. Serial No. 456,801.

*To all whom it may concern:*

Be it known that I, JULIUS D. HAYNSWORTH, a citizen of the United States, and a resident of Mansfield, in the county of Richland and State of Ohio, have invented a new and useful Improvement in Electrically-Heated Solder Pots, of which the following is a specification.

My invention relates to electrically heated apparatus and particularly to electrically heated solder pots and it has for one of its objects to provide a relatively simple and compact device of this type.

Another object is to provide a single means for holding a material container, a heating element and a terminal-supporting means in proper relationship to each other and in operative positions in the casing.

In practicing my invention, I provide a suitable casing, substantially tubular in form, in which is mounted a suitable container for the material to be heated. The container is provided with an integral and radially extending flange for supporting the container upon the top of the casing.

I provide a two-part heating element, one part being substantially tubular in form and surrounding the container, the other part being substantially flat and held against the bottom of the container. I provide a contact-terminal-supporting member located at the bottom of the casing and I provide also a single means for clamping the flange of the container against the top of the casing, for holding the two heating elements in proper position and for holding the terminal-supporting member in its proper operative position in said casing.

In the single sheet of drawings,

Figure 1 is a top plan view of the device embodying my invention;

Fig. 2 is a view, in vertical cross-section, on the line II—II of Figure 1, and

Fig. 3 is a view, in bottom view, looking upward, of the device embodying my invention.

A casing 1 is made up of relatively thin sheet metal bent to substantially cylindrical form, the over-lapping ends of which may be riveted or welded together and be cut away at the bottom edge, as indicated at 2, to provide a plurality of feet 3. A bail 4 is attached to the casing 1 by suitable lug members 5 which are secured to the casing 1.

A metal container 6 is provided with an integral radially-extending flange 7 having a down-turned portion 8 at the outer edge thereof. An annular washer 9, of asbestos or other similar material which will act as a means for reducing the flow of heat from the flange 7 to the casing 1, is located between the flange 7, the down-turned portion 8 and the top of the casing 1. The down-turned portion 8 of the flange 7 also acts as a means for centering the container 6 in the casing 1.

A substantially tubular refractory resistor-supporting member 10 surrounds the container 6. A plurality of grooves 11 are provided on the inner surface of the member 10 in which is located a resistor member 12 indicated only in part. The usual form of construction of the member 12 is that of a helix of a suitable resistor wire. A substantially flat refractory resistor-supporting member 13 is located beneath the bottom of the container 6, the upper surface thereof being provided with a groove or grooves 14 in which is located a resistor 15 which may be substantially the same as the resistor 12.

Suitable control means, such as a multi-heat switch, (not shown) may be mounted on the casing 1 or be connected in the supply circuit conductors, and the two resistor elements 12 and 15 be so connected thereto that both the side and the bottom heating element are energized when a high heat is desired, the bottom heating element being energized when medium heat is desired and the side heating element being energized when low heat is desired.

In order to hold the heating elements in their proper operative positions in the container 6, I provide an elongated metal bar 16, located below the member 13, and I interpose therebetween a sheet 17 of mica and a sheet 18 of asbestos. I provide a plurality of bolts 19 which extend through suitable openings 20 in the flange 7 and through suitable openings 21 in the bar 16, clamping it and the strips 17 and 18 against the member 13 by means of suitable nuts 22 on the bolts 19.

A terminal-supporting member 23 of suitable insulating material is provided, on which are mounted a plurality of contact terminals 24 to one end of each of which the ends of the resistor elements 12 and 15 may be connected, the other ends of the terminals being connected to a suitable supply-circuit conductor 25. The member 23 is mounted on the under side of a thin sheet-metal member 26 which is of such outline as to fit closely into the casing 1. A suitable opening 27 is provided in the member 26 through which the inner ends of the bolts holding the terminal bars 24 may project.

A suitable thin sheet-metal cover member 27ª is provided for the terminal-supporting member and is secured in proper operative position by means of suitable bolts 28.

In order to provide means for cooperating with the bolts 19 to hold the container 6 and the heating elements associated therewith tightly in the casing 1, I provide a plurality of integral struck-in portions 29 near the bottom of the casing 1, these portions being bent substantially at right angles to the casing 1. The member 26 is clamped against the under side of these struck-in portions being held thereagainst by means of suitable nuts 30 on the bolts 19.

In order to provide means for restricting the flow of heat outwardly and downwardly from the heating elements, I provide suitable heat-insulating material 31, such as mineral wool, located above and outside the upper resistor-supporting member and below the lower resistor-supporting member and clamping bar 21 and above the plate 26.

It may be noted that the use of the device embodying my invention provides a relatively simple, compact and heat-insulated fluid container which is electrically heated. I provide a single means for holding the heating element in proper operative position in regard to the container and for holding the container and heating element in proper operative positions in the casing and for also holding a terminal supporting member in its proper operative position in the casing.

Various modifications may be made in the device embodying my invention without departing from the spirit and scope thereof, and I desire that only such limitations shall be placed thereon as are imposed by the prior art or are specifically set forth in the appended claims.

I claim as my invention:—

1. In an electrically heated apparatus, the combination with a casing and a combined container and casing cover member in said casing, of heat insulating means located between said cover member and the upper edge of said casing for reducing the heat flow therebetween.

2. In an electrically heated apparatus, the combination with a casing, a container in said casing, and a heating element operatively engaging said container, of clamping means located outside of said heating element for holding the same in its operative position, and means for reducing the flow of heat from said heating element to said clamping means.

3. In an electrically heated apparatus, the combination with a casing, a container, a heating element and a terminal-supporting member in said casing, of a single means cooperating with integral portions of said casing for holding the said container, heating element and terminal-supporting member in their operative positions in said casing.

4. In an electrically heated apparatus, the combination with a casing of substantially tubular form, a combined container and casing-cover member substantially coaxial with said casing and located therein, a tubular heating element surrounding said container, a second heating element located beneath said container and a terminal-supporting member located in the lower part of said casing, of a single means for holding said heating elements in operative relation to said container and for cooperating with integral portions of said casing to hold said container, heating elements and terminal-supporting member in operative positions in said casing.

5. An electrically heated apparatus comprising a casing, a container, a heating element, a terminal-supporting member located in said casing, means operatively engaging said container and cooperating with integral portions of said casing for holding all of said parts in proper operative relation to each other, and heat-insulating means located between said heating element and said casing and between said heating element and said terminal-supporting member.

In testimony whereof, I have hereunto subscribed my name this 12 day of March, 1921.

JULIUS D. HAYNSWORTH.